United States Patent [19]
Orfei

[11] 3,805,415
[45] Apr. 23, 1974

[54] EDUCATIONAL INQUIRY BOX TOYS
[75] Inventor: John B. Orfei, North Revere, Mass.
[73] Assignee: American Science & Engineering, Inc., Cambridge, Mass.
[22] Filed: June 5, 1972
[21] Appl. No.: 259,562

[52] U.S. Cl.............. 35/22 R, 273/109, 273/153 R
[51] Int. Cl.......................... G09b 19/00, A63f 7/04
[58] Field of Search........... 35/22 R, 29 R; 273/109, 273/113, 115, 153 R

[56] References Cited
UNITED STATES PATENTS
732,312   6/1903   McLeod.............................. 273/109
906,971   12/1908  Watmough.......................... 273/113

Primary Examiner—Wm. H. Grieb
Attorney, Agent, or Firm—Charles Hieken, Esq.; Jerry Cohen, Esq.

[57] ABSTRACT

A series of sealed containers each of which has a rolling ball and an internal configuration defining a different areal shape for accommodating the rolling ball. The container walls are opaque or optionally slightly translucent to the user in at least one direction so that he must rely upon sound and/or "feel" to sense the position of the rolling ball within the container. The various containers of a set are color coded to correspond to different internal configurations. The system represents a model and develops and illustrates the senses involved in constructing the mental model of the configuration within the container. An improved apparatus for such a system is afforded through provision of a series of slab-like containers made of upper and lower halves which enclose an internal area defining member which is positionally aligned and restrained in a given configuration by the upper and lower container halves.

2 Claims, 6 Drawing Figures

PATENTED APR 23 1974 3,805,415

John B. Orfer
By Charles Hicken, Attorney

EDUCATIONAL INQUIRY BOX TOYS

BACKGROUND OF THE INVENTION

The present invention relates in general to sensitivity training and more particularly concerns an improvement in apparatus and techniques for testing and teaching the utilization of auditory senses, as well as feel, balance and sight if applicable, as accomplished through a combination of touch, hearing, sight and judgment.

The educational purpose of the unit is to inroduce and develop the concept of a scientific model so that children can apply concrete experience and abstract thought in the comprehension of scientific systems, for example electromagnetic circuits. In order to develop a model one must make observations and conceptually develop an abstract system. There is a distinction between a conceptual and literal model and models change as our understanding of the system increases. A good example is the model of the atom which has developed from a structureless billiard ball to a cloud of probability.

It is an important object of the invention to provide an improved construction of educational apparatus system which tests and develops the senses of hearing and feel, and develops abstract reasoning upon which the student may construct a model.

It is a further object of the invention to provide an economically producible educational apparatus consistent with the foregoing object.

It is a further object of the invention to provide an educational apparatus, which because of its general interest and play value, can also be used as a puzzle type toy.

It is a further object of the invention to provide a compact and simple apparatus system consistent with the foregoing objects.

It is a further object of the invention to provide an apparatus system which is substantially invulnerable to damage from, and is not dangerous to, small children.

SUMMARY OF THE INVENTION

The purposes of the invention are fulfilled through the provision of a series of sealed containers. Each of these containers is hollow and has opposing faces therein defining a narrow (in the z direction as hereinafter defined) passage which has a large area (in the x and y direction as hereinafter defined). A roller means is provided to move freely with low friction in this passage which is defined in the hollow container.

Each container is a hollow thin-walled vessel with a definite external area which can be viewed by the user. The above mentioned internal passage is formed by means internal of the container which vary the internal configuration so that it is different from the external areal configuration of the container.

Each of the series of containers is essentially opaque in at least one direction. However one or more of the series of containers may have another wall thereof, which has to be viewed from a different direction than the opaque wall, which is translucent so that when the container is held up towards the light source the viewer who has interposed the container betweem himself and the light source may be able to detect the position of the internal roller means.

In a preferred embodiment, which is distinctly advantageous, the containers have slab-like forms and the roller means comprise a simple metal spherical ball.

The containers have contrasting density with respect to the roller means and will tend to make noise when they are vibrated. The roller must have a higher density than the container. The containers may be made of known structural thermo plastics materials such as high impact styrene or polyethelene. They are preferably made in separately molded sections which can be bonded together. The means for altering the internal area configuration of the container are inserts which are frictionally held within the container when its component sections are bonded together. In preferred and distinctly advantageous embodiments, the slab-like container described above has pressed-indicia of direction as grooves on one of its otherwise smooth opposing walls. That wall is covered internally by a matching platform and an obstruction defining wall is mounted on and extends from that platform to the opposing container wall. The purpose of the platform is to prevent observation of the ball as it rolls along the base wall and to lift the obstruction off the base wall so that its outline cannot be seen. It also prevents the ball from being caught within the grooves of the directional design.

The series of containers should be alike in external configuration to allow a common method of manufacture and external appearance. However, they should be color coded or otherwise distinguishable to a user of the series. The internal obstruction means — i.e., platform/obstruction sets — defined in different ones of the series of containers are substantially different and involve such permutations as creating a simple variation of the geometric figure from the external appearance to the internal passage configuration; providing a blind alley passage where the roller can only return by the same path as it entered; providing a multiplicity of such blind alleys; merely reducing the area of the internal passage as compared with the external configuration, while retaining the same basic shape; providing corner blocking ramps; triangles or other shapes projecting out from the center of a side wall.

The internal roller may also be made of magnetic material which will allow utilization of an external magnet in development of the model.

Numerous other features, objects and advantages of the invention will become apparent from the following specification when read in connection with the accompanying drawing in which:

DETAILED DESCRIPTION OF PREFERRED EMBODIMENTS

Figure 1:
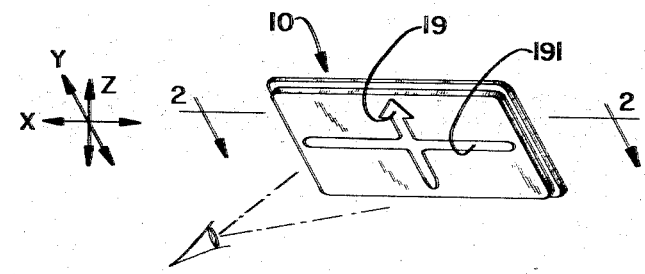
FIG. 1 is an isometric sketch of a typical container of a series of containers according to the invention being held by a user and indicating the x, y, z direction convention used herein.

Referring now to FIG. 1, the user is holding up one of the containers 10 and observing the external area configuration on the bottom of the slab-like from of the container, as viewed in the *x, y* direction. The container 10 has a very narrow thickness in the *z* direction. The double headed arrows *x, y, z* show these respective directions for purposes of the present specification and description of the containers. The containers are hollow plastic vessels and have an arrow 19 and crossbar 191 thereon, both of which are simple beaded (on one side, grooved on the other) deformations of the bottom plastic wall of the container. These provide a guide and a reminder to the user of the tiling degrees of freedom that he is using at a given moment, in a fashion similar to that used by aircraft pilots in learning to handle their joysticks.

Figure 2:
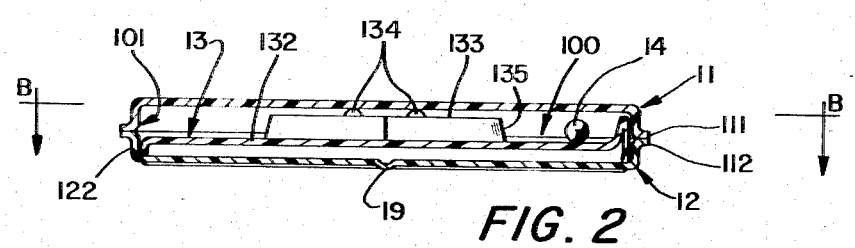
FIG. 2 is a cross section view taken along line 2—2 in FIG. 1 of a typical container illustrating constructional features.
Figure 3:
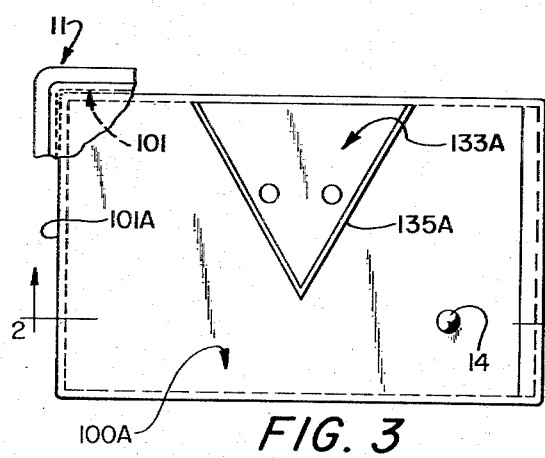
FIG. 3–6 are sectional views of different ones of a series of the containers viewed as in the direction by the arrows B—B in FIG. 2 with the container top being removed by the section technique used.

Referring now to FIG. 2, there is shown a cross section of a typical container 10, the cross section being cut and viewed as indicated by the arrows 2—2 going through the container 10 of FIG. 1. As can be seen in FIG. 2, the container 10 has a two piece construction comprising an upper portion 11 and a lower portion 12. These are both of vacuum formed thermoplastic sheet. Flanges 111, 112 are formed on the rims of the upper and lower parts 11 and 12, respectively. A platform insert 13 is provided within the container and comprises a supporting rim 131 a platform base 132, generally covering the lower wall formed by the section 12, and a raised obstruction-defining mesa 133 which has a pair of spacing beads 134 theron. The mesa 133 alters the area configuration within the hollow container to make it different from the external area configuration of the container. A metal ball 14 is set in the container to roll in the passage 100 formed within the container 10, around the obstruction, by upper wall 11, the platform 132 and the side wall 135 of mesa 133, as well as by side wall 101 formed by the side walls 112, 122 of the respective container forming parts 11 and 12, respectively.

The parts 11 and 12 — after insertion of the platform insert 13 and ball 14 — are bonded by ultrasonic welding along the perimeter of their flanged connection 111, 112. The arrow 19 which was shown in FIG. 1, described above is molded into the lower plastic wall 12 in the course of making it. Typically it is a ⅛ inch radius semi-cylindrical bead. Similarly the spacing beads 134 of hemispherical form and have a ⅛ inch radiul. The platform assembly 13 is frictionally held in place by the welded together sections 11 and 12. Typical dimensions of the container are 3 and ¼ inches length in the *x* direction, 2 and ⅛ inches width in the *y* direction and ½ inch thickness in the *z* direction.

FIG. 3–6 show four containers of a series in section as viewed in the direction indicated by the arrows B-B in FIG. 2 with the top section 11 removed. In these figures, one sees their respective mesas 133*a*, 133*b*, 133*c*, 133*d*, respectively. The respective side walls 135*a*, 135*b*, 135*c*, 135*d* of these obstruction forming mesas cooperate with the container side walls to define the internal area configurations of passages 100*a*, 100*b*, 100*c*, 100*d*, respectively. Arrows 2—2 in FIG. 3 relate these figures to the FIG. 2 cross-section.

It can be seen that the ball 14 can roll freely along any of the left hand, right hand and lower (as viewed in the top cut-away view of FIG. 3) side walls of the container when fitted with the platform 100*a* with obstruction 133*a*. However when rolling in the *x* direction near the obstruction 133*a* the ball strikes side walls 135*a* and is deflected, either rebounding or rolling along a side wall (135*a* or a container side wall), depending on *y*-tilt and impact speed. The user experiments with various tilts and notes the sound and feel response of the apparatus and inductively reasons out a mental model of the obstruction configuration and resultant internal area. A sense of definition of a shape in terms of crudely measured nonvisual data is thus exercised.

Figure 4:
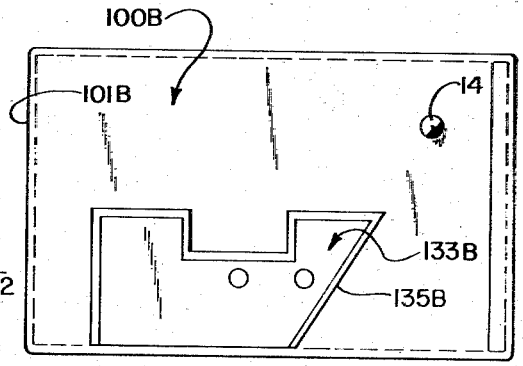
Figure 5:
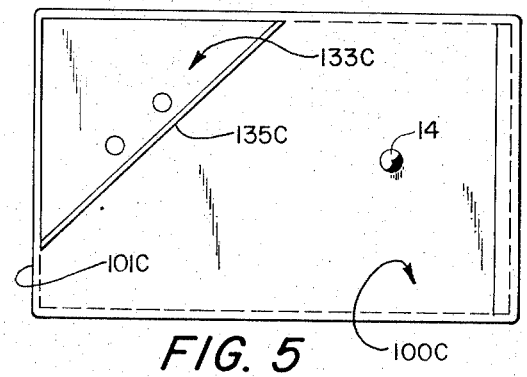
Figure 6:
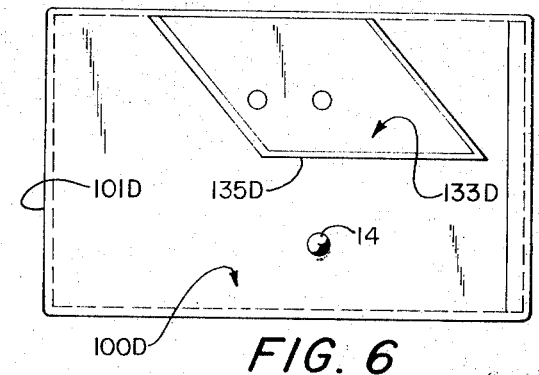

The FIG. 4–6 embodiments provide similar exercises with different degrees of difficulty and variety to maintain interest and challenge.

There has been described novel apparatus capable of educating, training and developing sensitivity which is inexpensive and easy to fabricate. It is evident that those skilled in the art may now make numerous uses and modifications of and departures from the specific embodiments described herein without departing from the inventive concepts. Consequently, the invention is to be construed as embracing each and every novel feature or novel combination of features present in or possessed by the apparatus and techniques herein disclosed.

That is claimed is:

1. Improved sensitivity training appratus comprising, means defining a hollow enclosed apparatus of slab-like form, said container defining means having opposed faces connected by narrow side wall means with relatively large dimensions in the *x* and *y* directions taken in the plane which is orthogonal to the thickness dimension in the *z* direction, roller means for moving freely with low friction in said hollow container and the *x* and *y* directions, means rendering at least one of said opposing container faces opaque to an outside viewer, means defining an obstruction within said container to alter the internal area configuration of said container so that the available area for *x-y* movement of said roller means is substantially different from that which is viewed from the outside when looking at said opaque face, the obstruction defining means comprising a platform filling the available internal volume of the container for roller movement in the *x* and *y* directions in a plane parallel to one of said opposed faces and a projection extending in the *z* direction between an opposed container face and the platform, and wherein the said apparatus is constructed and arranged so that movement of the roller means within said container is detectable from outside through at least one of the senses of hearing, touch, balance, judgment and feel, said container is of multi-piece sealed together construction with an internal insert defining at least a portion of the opacifying and obstruction-defining means, the internal insert being frictionally held by the bonded together portions of the multi-piece construction of the container, said insert is constructed and arranged in the form of a platform filling the available internal volume of the container in the *x* and *y* directions, for the roller to move in, in a plane parallel to an external face wall thereof and wherein said insert further comprises a projection in the *z* direction extending toward an opposing external wall of the container, the said projection having side walls to define said obstruction, which together with side walls of the container, said opposing wall and said platform, define said internal passage, and said platform has an integral supporting rim around its periphery extending in the z direction to a first one of said opposed walls of the container and the said projection extending from the platform towards the second of said opposed container walls.

2. The apparatus of claim 1 wherein, said second container wall is marked with indicia of direction through a break in its surface smoothness, wholly outside and in non-interfering relationship with the said internal passage for said roller means.

* * * * *